United States Patent [19]
Martinez

[11] Patent Number: 4,646,274
[45] Date of Patent: Feb. 24, 1987

[54] METHOD AND APPARATUS FOR CORRECTING DISTORTED SEISMIC DATA

[75] Inventor: David R. Martinez, Plano, Tex.

[73] Assignee: Atlantic Richfield Company, Los Angeles, Calif.

[21] Appl. No.: 564,104

[22] Filed: Dec. 21, 1983

[51] Int. Cl.$^4$ ............................................. G01V 1/28
[52] U.S. Cl. ........................................ 367/41; 367/46
[58] Field of Search .................... 367/43, 46, 190, 41, 367/42, 20

[56] References Cited

U.S. PATENT DOCUMENTS

| | | | |
|---|---|---|---|
| 3,523,277 | 8/1970 | Landrum | 367/41 |
| 4,173,749 | 11/1979 | Corkhill | 367/190 |
| 4,223,399 | 9/1980 | Hackett | 367/41 |
| 4,348,749 | 9/1982 | Galbraith | 367/46 |
| 4,397,006 | 8/1983 | Galbraith, Jr. | 367/42 |

Primary Examiner—Thomas H. Tarcza
Assistant Examiner—Daniel T. Pihulic
Attorney, Agent, or Firm—Robert M. Betz; Robert D. Lott

[57] ABSTRACT

Distortion in vibrator-type seismic records is corrected by measuring and using the actual ground force imparted by the source to develop an inverse filter. The ground force signal and the reflected seismic data are both subjected to the same deconvolution or other standard processing technique, thereby automatically filtering out flaws introduced by any such technique.

13 Claims, 9 Drawing Figures

4,646,274

METHOD AND APPARATUS FOR CORRECTING DISTORTED SEISMIC DATA

BACKGROUND OF THE INVENTION

1. Field of the Invention

This invention relates to a method and apparatus which corrects for distortion in seismic records. More particularly the invention relates to a method and apparatus for removing phase distortion from deconvolved seismic data records generated with the use of vibrational energy.

2. Description of the Prior Art

In seismic prospecting, a seismic energy source is employed to generate a seismic signal transmitted into the earth. Part of this signal is reflected from subterranean interfaces back to the surface of the earth. There it is detected and converted to a seismic signal which is then recorded.

This recorded seismic field data is subjected to processing to improve its quality and thereby render it more meaningful to the geophysical interpreter. Filters used in such processing are designed so as not to change the time relation of reflective events. One type of this filtering, known as deconvolution, is in reality a form of inverse filtering which corrects for the previous filtering effects of the recording system and the earth itself. This inverse filter is determined from the record traces themselves. Reflective seismic field data such as that recorded in vibrated tests, after deconvolution in accordance with standard processing techniques, is still degraded by amplitude and phase errors not corrected by prior art methods.

A vehicle mounted vibrator includes a base plate lowered into contact with the earth and a heavy reaction mass coupled to said base plate. In a manner well known to the art, the vibrator is driven with an electronically generated frequency varying sine wave (hereinafter "pilot signal") so as to impart vibrational seismic energy into the earth. In U.S. Pat. No. 4,348,749 to Galbraith there is described a method for processing deconvolved seismic traces obtained from a vibrator to correct for phase distortion introduced in the deconvolution process. In this method a signal representing the minimum phase inverse of a synthetic version of the pilot signal is generated and convolved with such signal to obtain a first filtered function. The time reverse of this filtered function is then convolved with a signal representing the reflected seismic data after deconvolution in order to phase correct such traces. The use of Galbraith's pilot signal in the filtering process, however, continues to introduce phase errors. The reason is that Galbraith's technique ignores the difference between the pilot signal and the ground force actually imparted to the earth.

The prior art has recognized the distinction between the uncorrected signal pulse of a vibrator and the true ground force produced. As taught for example in U.S. Pat. No. 4,184,144 to Rickenbacker or in British Pat. No. 2,101,317 to De Kok, a correcting feedback signal is generated proportional to the combined mass acceleration of the base plate and reaction mass of the vibrator. The feedback signal may be used to adjust the actuator mechanism so that the phase and amplitude of the vibrator motion is representative of the pilot signal. Use of a pilot signal so corrected in processing of output field data, however, still fails to make full use of the information available by measuring the true ground force. It is therefore an object of this invention to provide an improved method and apparatus for correcting distortion in procesed seismic field data.

It is a more particular object of this invention to provide such a method and apparatus wherein such field data is generated by means of a vibrator. It is a still further object of this invention to provide a method and apparatus for correcting distortion in seismic data generated with a vibrator wherein the errors inherent in any standard processing technique are minimized.

Other objects and advantages of this invention will become apparent from a consideration of the detailed description to follow taken in conjunction with the drawings and appended claims.

SUMMARY OF THE INVENTION

This invention is directed to a method and system for correcting distorted seismic field data. In a preferred embodiment a weighted source signature is measured by combining the mass acceleration of the base plate and the reaction mass of a vibrational seismic source. This weighted source signature is recorded simultaneously with the reflected seismic signal. After standard processing the source signature is used to generate an inverse filter. The output of this inverse filter is convolved with the reflected data after an equivalent standard processing step to produce a corrected output.

The invention comprises both the method as outlined above and the means for carrying out such method. Furthermore the method and system of the preferred embodiment of this invention is applicable to the correction of VSP profile data as well as the correction of deconvolved surface data records.

DESCRIPTION OF THE PREFERRED EMBODIMENT

Figure 1:
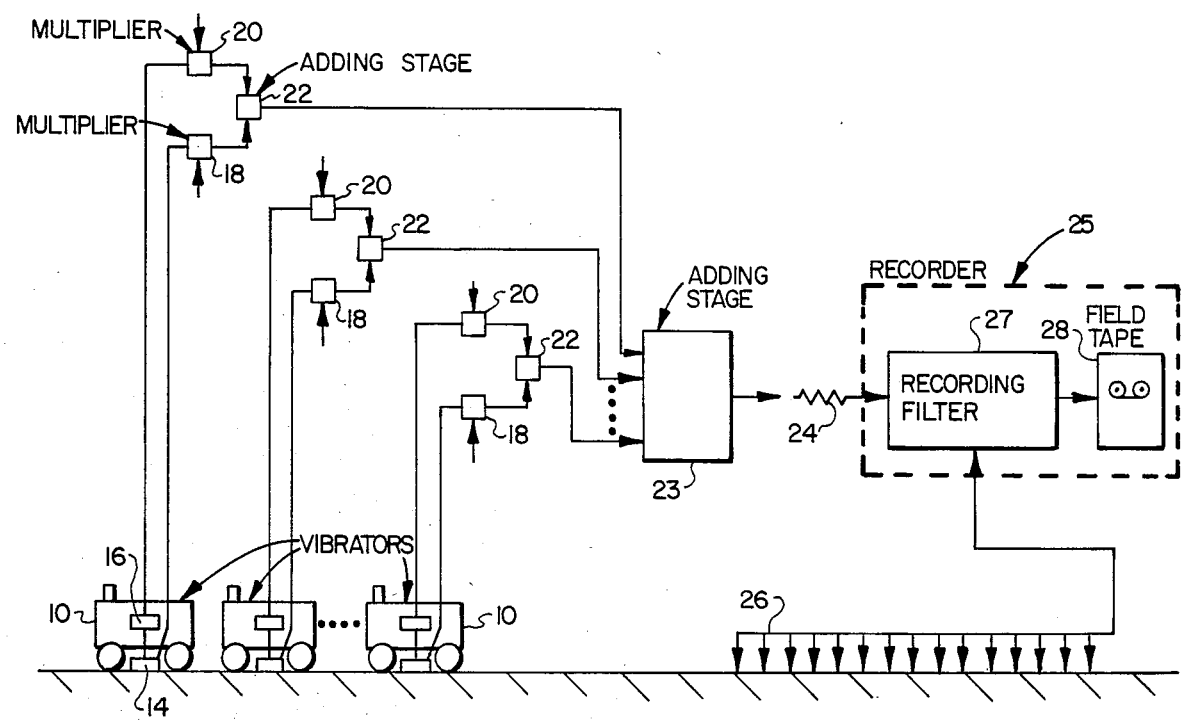
FIG. 1 is a schematic view of a field acquisition system for measurement of the effective ground force for a plurality of vibrators.

Although the subsequent detailed description is directed to the employment of a vibrator for production of seismic energy, the inventtion is not limited to any particular seismic source. With reference therefore to FIG. 1, there is illustrated a field acquisition system for measuring and recording the force transmitted into the ground by a plurality of vibrators 10 on the earth's surface 12. Signals from accelerometers (not shown) mounted on base plates 14 and the reaction masses 16 are fed through multipliers 18 and 20 respectively which weight these signals by the corresponding masses of base plates 14 and reaction masses 16. These weighted signals are passed through adding stages 22 and 23 to produce an effective ground force signal, G.F. which may be expressed by the equation:

$$G.F. = M_b \cdot \ddot{X}_b + M_r \cdot \ddot{X}_r$$

where $X_r$ equals reaction mass displacement, $X_b$ equals base plate displacement, $M_r$ equals massive reaction mass, $M_b$ equals mass of base plate, and $\ddot{X}$ equals the second derivative of X with respect to time. The resultant signal may be fed through a radio link 24 to a recorder 25, which also receives field data 26. After passing through recording filter 27, these respective signals are recorded on field tape 28.

It will be understood that for the purposes of this invention one may employ a single vibrator or any number of vibrators in the production of the true ground force signal to be utilized in this invention. The measurement and use of the true ground force imparted to the earth in generating a signal for use in developing a phase correcting inverse filter is believed to be a significant point of departure from prior art systems and methods. Any system for correcting distorted seismic signals which merely synthesizes or approximates this true ground force is inherently flawed.

Figure 2:
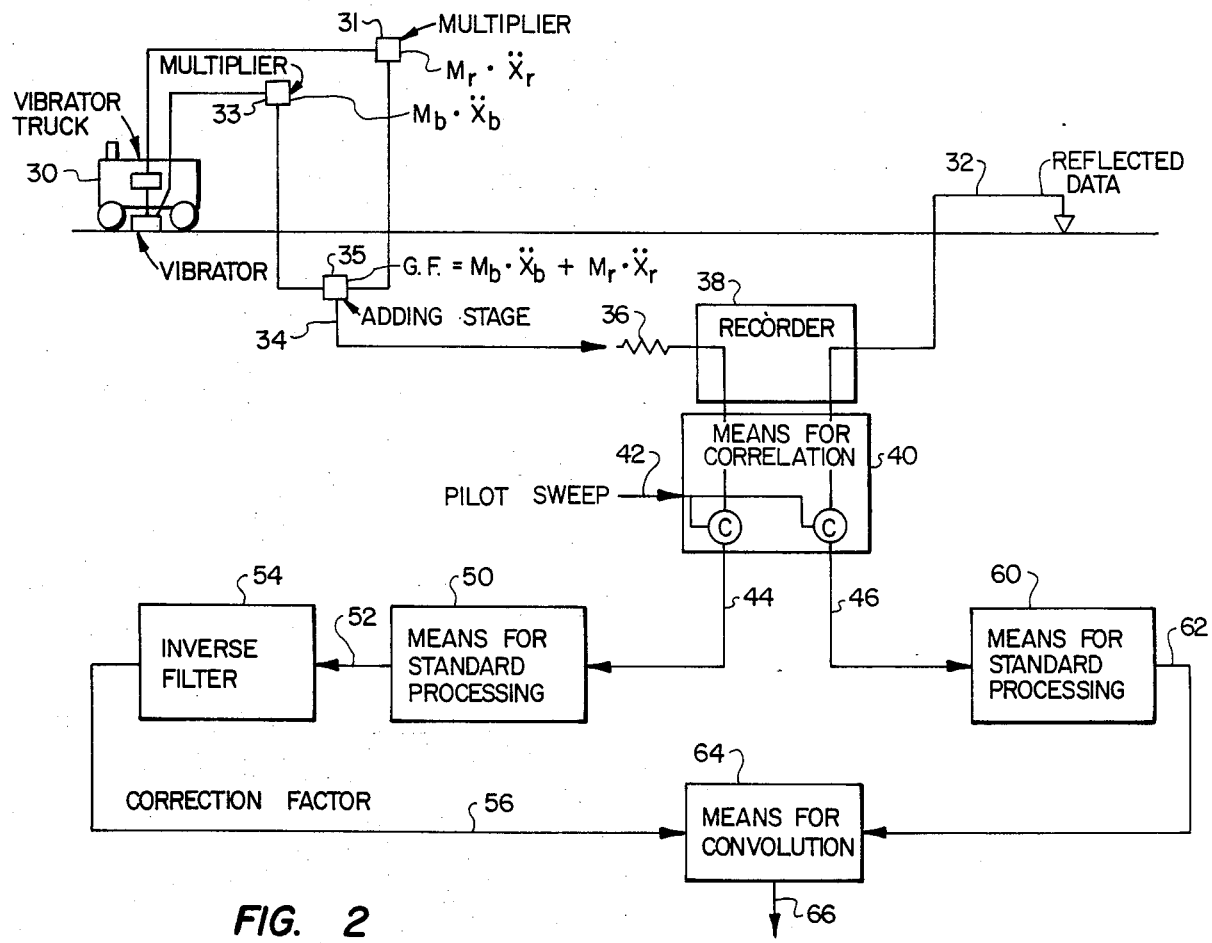
FIG. 2 is a block diagram illustrating the system and method of this invention.
Figure 3:
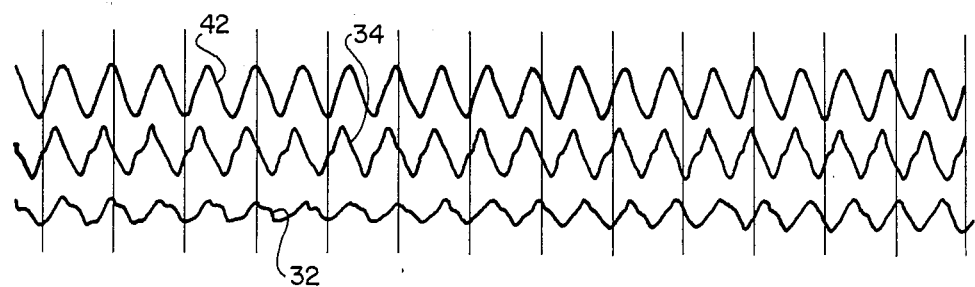
FIGS. 3 through 9 are schematic views of a series of seismic traces produced at various stages in accordance with the system of FIG. 2.
Figure 4:
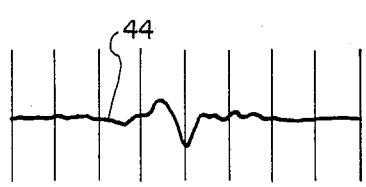
Figure 5:
Figure 6:

Turning now to FIG. 2 assume that a vibrator 30 generates seismic signals which produce a reflected trace 32 at the surface in the manner described in FIG. 1. A ground force signal 34 responsive to the operation of vibrator 30, after passing through multipliers 31 and 33 and adder 35, is fed via radio link 36 to recorder 38 where a suitable tape record is produced. Simultaneously the reflected seismic signal 32 is also fed to recorder 38 and recorded therein.

Block 40 represents functional means for correlating the recorded weighted source signature 34 with pilot sweep 42 for vibrator 30 to produce trace 44. In like manner the recorded output data trace 32 is correlated with pilot sweep 42 to produce trace 46.

Trace 44, by means of functional block 50 is subjected to standard processing involving, for example, a spiking deconvolution, in order to produce trace 52. By means of inverse filter 54 trace 52 is time reversed to generate a correction function 56.

Simultaneously with the above trace 46 is also subjected to the same standard processing procedure at functional block 60 to produce procesed trace 62. Finally correcting signal 56 and processed data trace 62 are convolved together at functional block 64 to produce a final corrected vibrator data output 66.

With more particular reference to FIGS. 3 through 9, the ground force signal 34 and reflective seismic signal 32 are predictably out of phase with the pilot signal 42 in addition to distortion in wave shape. A measure of the effectiveness of the processing method and apparatus of this invention is the degree to which this distortion can be overcomed. The success with which this invention accomplishes that purpose may be seen in the high degree of symmetry of the actual system output signal 66 (FIG. 8) as compared to the hypothethical ideal shown as trace 68, (FIG. 9) which is representative of an autocorrelation of pilot sweep 42. Trace 68 is what one would expect the reflected pulse to look like if neither the earth, or any man made filter mechanisms introduced any distortion.

An important feature of this invention is that the ground force signal trace 44 (FIG. 4) and reflected seismic signal trace 46 (FIG. 5) are both correlated with the same signal pulse, for example, pilot signal 42 as described. Other signal pulses may be employed for this purpose instead of pilot signal 42, such as, for example, ground force signal 34 itself. The advantage of using pilot signal 42 in this stage of processing is merely that it will require no change in existing standard techniques.

Figure 7:
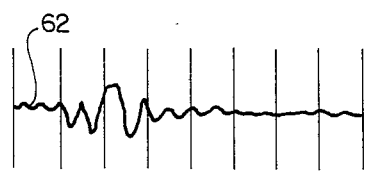
Figure 8:
Figure 9:
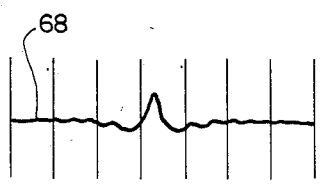

A further distinguishing feature of this invention is the fact that the traces 44 and 46 are both subjected to the same standard processing technique in order to generate respective traces 52 (FIG. 6) and 62 (FIG. 7). By "standard processing technique" as that term is used herein is met any of the well known seismic data processing techniques as described in the literature. For detailed discussion of such techniques reference may be had to either of the following sources, to wit:

Robinson and Treitel Geophysical Signal Analysis, Copyright 1980 by Prentice-Hall, Inc. Deconvolutions, Volumes I and II as S.E.G. Geophysical reprint Series copyright 1978 by Society of Exploration Geophysicists.

A typical standard processing technique involves what is known as "spiking deconvolution". But within the scope of this invention any technique may be employed in processing the output seismic data as long as the identical technique is duplicated in the generation of the correcting inverse function represented by trace 56. This way the flaws introduced by such technique are automatically filtered out.

As emphasized at the outset, this invention is not limited to use with a vibrator. For example, it may be employed with beneficial results with an impulsive land source or a marine source such as an air gun. The key requirement is that one be able to measure in a reliable way the actual force imparted to the earth. This may be accomplished by locating a downhole detector or, for marine work, a hydrophone, situated in the so called "far field", i.e. sufficiently removed from the source so as to enable accurate sensing of the acoustic frequencies involved. In actual practice, the measurement technique described in this specification has significant advantages because of its flexibility and adaptability to varying physical environments and source movement patterns.

One of the procedures typically carried out in the use of multiple vibrators in gathering field data in accordance with the prior art is the conduct of so called "similarity tests". The object of this procedure is to determine any differences between the individual vibrator motion and the pilot signal and adjust for these differences. When the vibrators are moved from one position to another in the performance of a survey these adjustments may no longer be valid. A significant advantage of the present invention is that it eliminates any need for such similarity tests and adjustments with respect to phase since the technique and apparatus described does not rely in any way upon establishing correspondence between the pilot signal phase and the actual signal injected into the earth.

I claim:
1. The method of correcting distorted seismic data obtained by applying seismic energy to the earth's surface and recording a wave trace representative of the resultant reflected seismic energy comprises the steps of:
   (a) recording a signal representing the ground force produced by the application of said energy wherein said ground force signal is derived from mass and acceleration parameters of an acoustic source used to produce said seismic energy;
   (b) correlating said ground force signal with a preselected signal pulse and correlating said reflected seismic wave trace with said preselected signal pulse in order to provide time compressed versions of said ground force signal and said reflected seismic wave trace respectively;
   (c) processing said time compressed ground force signal by means of a preselected technique and processing said reflected seismic wave trace by means of said preselected technique in order to remove distortion therefrom;

(d) deriving a correcting filter representing an inverse function of said processed ground force signal; and (e) convolving said correcting filter with said processed reflected seismic wave trace in order to provide a corrected seismic output.

2. The method of claim 1 wherein said preselected signal pulse is said ground force signal.

3. The method of claim 1 wherein said preselected signal pulse is said reflected seismic wave trace.

4. The method of claim 1 wherein said energy is produced by a vibrator.

5. The method of claim 4 wherein said preselected signal pulse is the known pilot signal for actuating said vibrator.

6. The method of claim 4 wherein said processing step incorporates a known form of spiking deconvolution.

7. The method of correcting distorted seismic data obtained by applying acoustic energy to a body of water and recording a wave form representing the resultant seismic reflections from the marine subsurface comprising the steps of:

(a) recording an acoustic signal representative of acoustic energy injected into said body water wherein said acoustic signal is derived from mass and acceleration parameters of an acoustic source used to produce said acoustic energy;

(b) processing said acoustic signal and said reflected seismic wave form by a common preselected processing technique in order to remove distortion therefrom;

(c) deriving a correcting filter representing an inverse function of said processed acoustic signal; and (d) convolving said correcting filter with said processed reflected seismic wave form to provide a corrected seismic output.

8. The method of claim 1 wherein said reflected seismic energy is measured at the earth's surface in order to produce said reflected wave trace.

9. The method of claim 1 wherein said reflected seismic energy is measured sequentially at successive depths in the earth to generate a vertical seismic profile.

10. The method of claim 1 wherein identical means are employed in recording said ground force signal and said reflected seismic wave trace.

11. The system for correcting distorted seismic data obtained by the application of vibrational seismic energy to the earth's surface in accordance with a known pilot signal and recording the surface reflections thereof comprising:

(a) means for recording a signal representing the true ground force produced by the application of said energy wherein said ground force signal is derived from mass and acceleration parameters of an acoustic source used to produce said seismic energy;

(b) means for correlating said ground force signal and surface reflections with said pilot signal;

(c) means for processing said correlated ground force signal and surface reflections by means of a common preselected amplitude and phase-error removal technique;

(d) means for generating a correcting filter representing an inverse function of said processed ground force signal; and (e) means for convolving said correcting filter with said processed surface reflections to generate a corrected seismic output.

12. The system of claim 11 wherein said vibrational energy is applied by means of a plurality of vibrators each including at least a base plate and a reaction mass, wherein said ground force is a signal obtained by measuring the acceleration of each of said base plates and reaction masses, multiplying said accelerations by the respective masses of said base plates and reaction masses, and summing the products thereof.

13. The system of claim 12 wherein said signal is supplied to said recording means through a radio link.

* * * * *